US009049395B2

(12) United States Patent
Van Der Wal et al.

(10) Patent No.: US 9,049,395 B2
(45) Date of Patent: Jun. 2, 2015

(54) PROCESSING CIRCUIT FOR AN X-RAY SENSOR

(75) Inventors: Roelf Van Der Wal, Aachen (DE); Lex Alving, Mierlo (NL); Walter Ruetten, Linnich (DE)

(73) Assignee: Trixell, Moirans (FR)

( * ) Notice: Subject to any disclaimer, the term of this patent is extended or adjusted under 35 U.S.C. 154(b) by 211 days.

(21) Appl. No.: 13/375,514

(22) PCT Filed: Jun. 16, 2010

(86) PCT No.: PCT/IB2010/052701
§ 371 (c)(1),
(2), (4) Date: Dec. 1, 2011

(87) PCT Pub. No.: WO2010/150141
PCT Pub. Date: Dec. 29, 2010

(65) Prior Publication Data
US 2012/0080606 A1 Apr. 5, 2012

(30) Foreign Application Priority Data

Jun. 22, 2009 (EP) .................................... 09163370

(51) Int. Cl.
*H04N 5/32* (2006.01)
*H04N 5/378* (2011.01)
*H04N 5/365* (2011.01)

(52) U.S. Cl.
CPC ................. *H04N 5/378* (2013.01); *H04N 5/32* (2013.01); *H04N 5/365* (2013.01)

(58) Field of Classification Search
CPC .......... H04N 5/32; H04N 5/365; H04N 5/378; G01T 1/24
USPC ........ 250/370.09, 370.11; 348/241, 342, 346, 348/348, 308; 330/278, 279, 284, 288
See application file for complete search history.

(56) References Cited

U.S. PATENT DOCUMENTS

| 4,777,428 A | 10/1988 | Lundback |
| 6,344,877 B1 * | 2/2002 | Gowda et al. ................. 348/245 |
| 6,821,808 B2 * | 11/2004 | Nakamura et al. ............. 438/57 |
| 2002/0196352 A1 * | 12/2002 | Boemler ........................ 348/241 |
| 2003/0164441 A1 * | 9/2003 | Lyon et al. .................. 250/208.1 |
| 2005/0035271 A1 | 2/2005 | Kochi et al. |

OTHER PUBLICATIONS

"Collect". Definition—Merriam-Webster Online Dictionary.*

* cited by examiner

*Primary Examiner* — Casey Bryant
(74) *Attorney, Agent, or Firm* — Baker & Hostetler LLP (57) ABSTRACT

A processing circuit for an X-ray sensor for collecting at least a first pixel information of a first pixel and a second pixel information of a second pixel is provided. The processing circuit comprises an amplifier (112), a feedback loop (113) and a first collecting device (111). It is provided a compensation for a non-linearity in the pixels or in the pixel circuits (100, 200) by applying an inverse non-linearity (125) in the periphery of the X-ray sensor. A processing circuit (110) may provide a copy of a pixel voltage and/or of a pixel charge. In the case of pixel charge a non-linear characteristic of a pixel capacitance may be compensated.

20 Claims, 5 Drawing Sheets

PROCESSING CIRCUIT FOR AN X-RAY SENSOR

FIELD OF THE INVENTION

The present invention relates to the field of X-ray devices, and more specifically to a processing circuit for an X-ray sensor, to an X-ray detector and a method for providing a pixel information of a plurality of pixels of an X-ray sensor.

BACKGROUND OF THE INVENTION

X-ray devices, such as X-ray detectors or X-ray converters may transform X-ray radiation into optical photons. These devices may provide an image. An X-ray detector or an X-ray converter may comprise one or a plurality of sensor elements, which may provide one or a plurality of electrical signals. These sensor elements may comprise an array or a matrix of single pixels. Each pixel may contribute to an image taken by the X-ray detector. The sensor elements may comprise a transfer function, respectively.

U.S. Pat. No. 4,777,428 describes a device for compensation of transfer functions. A signal from a unit to be compensated is connected to a differential amplifier with a feed-back network having a transfer function that is substantially the same as the transfer function to be compensated. A compensation device has a transfer function that approximately is inverse to the transfer function of the sensor. A signal that the sensor senses and that is distorted by a non linear transfer function is restored.

The image quality of an X-ray device may be dependent on the voltages or charges provided by each pixel. Voltages or charges provided by the pixels may be influenced by many factors, such as coupled voltage from a bus system and/or leakage currents. Moreover, structural noises may be present.

SUMMARY OF THE INVENTION

There may be a need to improve an X-ray device, especially an X-ray sensor.

According to an exemplary embodiment of the present invention, there is provided a processing circuit of an X-ray sensor, an X-ray detector and a method for providing a pixel information of a plurality of pixels of an X-ray sensor.

According to an exemplary embodiment of the present invention, a processing circuit for an X-ray sensor for collecting at least a first pixel information of a first pixel circuit and a second pixel information of a second pixel circuit may be provided. The processing circuit may comprise an amplifier, a feedback loop and a first collecting device. The amplifier may comprise a first amplifier input, a second amplifier input and an amplifier output. Moreover, the feedback loop may comprise a feedback loop input and a feedback loop output. The first amplifier input may be connected with the first collecting device and the second amplifier input may be connected with the feedback loop output. Furthermore, the first collecting device may be adapted to be connected with the first pixel circuit of the X-ray sensor. In addition, the first collecting device may be adapted to be connected with the second pixel circuit of the X-ray sensor. The feedback loop input may be connected with the output of the amplifier. The feedback loop output may be connected with the second input of the amplifier. The feedback loop may comprise a first transfer function, which first transfer function may be substantially identical to a second transfer function of the X-ray sensor.

X-ray devices may comprise a conversion device. In X-ray detectors, X-ray quanta may be converted into charge. It may be distinguished between direct conversion types and indirect conversion types. In direct conversion types, the X-ray quanta may be converted directly into charge. In indirect conversion types, the X-ray quanta may firstly be converted into light in a scintillator layer which may be glued to the X-ray sensor or sensor. This light may be converted into charge by a photodiode.

For X-ray detectors CMOS sensors (CMOS=complementary metal-oxide-semiconductor) may be used. The CMOS sensor may comprise an array of pixels, wherein each pixel may comprise a photodiode. Each photodiode may convert the light of the scintillator into charge. This charge may be collected on a capacitor and may be converted into a voltage. The voltage of the capacitor may be buffered and transferred to a periphery of the CMOS sensor.

When using source followers as buffers, it may occur that a transfer function of the X-ray sensor may be of non-linear characteristic and the transfer function may be temperature-dependent. Due to the temperature dependency, a dark reference picture may change in time. Therefore, it may be suitable to update this dark reference picture from time to time. In the case the temperature dependency has a high influence on the sensor it may occur that measures may have to be taken in order to control the temperature of the X-ray sensor or X-ray detector. Due to the non-linearity, a gain map may differ for high dose and low dose and may change over temperature. Thus, it might be difficult to compensate for gain differences. Furthermore, for three-dimensional (3D) applications, non-linearity may cause artefacts in the reconstructed image or picture of the X-ray sensor.

Buffers in the pixel of the X-ray sensor or in the pixel circuit may result in a non-linear temperature dependent transfer function. Each pixel circuit may comprise such a transfer function. Each signal of each pixel circuit may be collected with a collector or a collecting device. Such a collecting device may be a multiplex switch.

Each pixel circuit may have its own transfer function. Each single pixel of a sensor array may provide the same or almost the same characteristics. Thus, each pixel may comprise the same transfer function or substantially an identical transfer function compared to the further pixels of the array. The signals of the pixels may be amplified in order to provide an image.

The amplifier may comprise a feedback loop. The feedback loop may comprise a transfer function, which may be different from the transfer function of each single pixel. If the same or substantially identical transfer function as given by a single pixel may be applied in the feedback loop of the amplifier in the periphery of the X-ray sensor, the amplifier may control its output such that the negative input of the amplifier may have the same voltage as the positive input of the amplifier, which may be the buffered output of one single pixel. If the transfer function of a single pixel is the same as the transfer function of the feedback loop, the output of the amplifier may be the same as of the unbuffered pixel value.

In other words, there may be provided an additional non-linear circuit in the feedback loop of the amplifier. The feedback loop may comprise the same transfer function, referred as first transfer function, as the transfer function of the non-linear pixel circuit of one single pixel, referred as second transfer function. The output voltage of both non-linear circuits may be the same, meaning the circuit of the X-ray sensor and a processing circuit in the periphery of the X-ray sensor may comprise the same transfer function. Thus, a compensation of structural noises may be provided. These structural noises may originate from electrical components or structures, which should be physically identical, but differ from each other, for example due to a manufacturing process or aging phenomena. In other words, such electrical components or structures, such as semiconducting structures, may be unintentionally individual different. These physical differences may also occur when a plurality of wafers may be used within one X-ray device. Structural noises may also occur when different columns or lines of a pixel array may be compared. Other structural noises may originate from electrical components, such as amplifiers. Structural noises may be compensated by the processing circuit, especially a compensation or reduction of structural noises may be provided for structural noises which may originate from one or more pixel circuits. The processing speed of the image processing may not be influenced, especially not decreased.

The collecting device may be a multiplex switch, which may be an electric or an electronic component within the electrical processing circuit. The multiplex switch may collect a pixel voltage or a pixel charge of a plurality of pixels. The multiplex switch may collect the pixel information of one row of pixels. One row of pixels may be provided on a CMOS sensor, comprising an array of pixels with a plurality of rows. Therefore, each input connection of the multiplex switch may be connected with one output of a pixel, respectively.

With the collecting device a plurality of pixel information may be collected. The collecting device may be a multiplex switch, which may have a plurality of inputs and a single output. The plurality of inputs may be connected with one pixel circuit, respectively. Thus, one input connection of the collecting device may be connected to one output of a pixel circuit. The plurality of input connections of the collecting device may be connected to a plurality of pixel outputs in order to collect the signals of the X-ray sensor of a predetermined area. Such an area may be a column of an array or a row of an array, especially vertical or a horizontal row. Since one pixel may comprise the same circuit as other pixels of the array connected with the collecting device, the transfer function at the output of the collecting device may be the same or almost identical as the transfer function of one single pixel. Thus, the first input of the amplifier, which may be connected with the output of the collecting device may be the transfer function of one single pixel as well as the transfer function of a plurality of pixel circuits, since these both transfer functions are the same or substantially identical.

When both electrical circuits, the circuit of one single pixel and the circuit of the feedback loop of the amplifier may provide the same transfer function, the input voltage at the first input of the amplifier and the input voltage at the second input of the amplifier may be also identical or at least substantially identical. This may provide a copy of the pixel voltage, which copy may be generated or may be present in the periphery of the X-ray sensor. In addition, structural noise may be substantially eliminated or at least reduced.

In other words, the invention may provide a compensation for the non-linearity in the pixels or in the pixel circuits by applying an inverse non-linearity in the periphery of the X-ray sensor. The processing circuit according to the invention may provide a copy of the pixel voltage and/or of the pixel charge. In the case of pixel charge a non-linear characteristic of a pixel capacitance may be compensated. This pixel capacitance may be present in the pixel circuit. Also a combination of collecting a pixel voltage and collecting a pixel charge within one circuit connected to a plurality of pixels may be possible.

According to an exemplary embodiment of the invention, the pixel information may be a pixel voltage.

A pixel voltage is understood as a voltage which is provided by one single pixel across the photodiode of the pixel. A plurality of pixel voltages may be collected in order to read out an electric signal of one or a plurality of columns or of one or a plurality of rows of the imaging array.

According to an exemplary embodiment of the invention, the pixel information is a pixel charge.

A pixel charge may depend on the charge capacity of a pixel within a pixel circuit. A sensor may achieve a charge capacity of for example $1 \times 10^6$ electrons per pixel.

According to an exemplary embodiment of the invention, the first transfer function may be a non-linear transfer function.

According to an exemplary embodiment of the invention, the first transfer function may be a voltage dependent transfer function.

According to an exemplary embodiment of the invention, the first transfer function may be a temperature dependent transfer function.

The transfer function of the feedback loop, meaning the first transfer function, may be determined by the input voltage of the feedback loop compared to the output voltage of the feedback loop, wherein the output of the feedback loop may be at the same time the input of the amplifier, especially the negative input of the amplifier of the processing circuit.

The transfer function of the pixel circuit, meaning the second transfer function, may be determined by a pixel voltage across the photodiode of the pixel circuit compared to a buffered pixel voltage which may be present at the input of the processing circuit, especially at the positive input of the amplifier of the processing circuit.

A temperature dependency of a transfer function, especially of the second transfer function, may be caused for example by environmental temperatures, by different temperatures within one pixel array, by using different materials with different temperature coefficients and by long-term operation of the X-ray device.

A non-linear dependency of the transfer function may be caused for example by non-linear components in the pixel circuit, such as FETs, MOSFETS or buffers, by non-linear amplification of amplifiers and by non-unique physical properties within one pixel array or within one pixel row or column. Thus, the transfer function may be of non-linear characteristic due to buffers in the array circuit or pixel circuit.

According to an exemplary embodiment of the invention, the feedback loop may comprise a first buffer.

The first buffer may be a first source follower. The source follower may be provided by a FET (field-effect transistor), especially by a MOSFET (metal-oxide-semiconductor field-effect transistor), for example by a NMOS source follower (n-channel MOSFET). It may also be possible that the first buffer may be a PMOS source follower (p-channel MOSFET).

According to an exemplary embodiment of the invention, the feedback loop may comprise a second buffer.

This second buffer may be a second source follower, which may be a FET (field-effect transistor), especially a MOSFET, such as a PMOS source follower (p-channel MOSFET) or a NMOS source follower (n-channel MOSFET).

According to an exemplary embodiment of the invention, the feedback loop may comprise at least one current source.

Using one or more current sources may provide a higher speed of operation of the circuit for the X-ray sensor. Moreover, one or a plurality of current sources may provide a current in the feedback loop for compensating structural noises of the pixel signals. It may also be foreseen to provide a reference current source in the feedback loop of the amplifier. This reference current source may provide a charge which may be utilized to influence the first transfer function.

According to an exemplary embodiment of the invention, the feedback loop may comprise a capacitor.

Using a capacitor may provide a more stable behaviour of the amplifier. Moreover, a capacitor may be utilized in order to adjust the first transfer function of the processing circuit.

According to an exemplary embodiment of the invention, the feedback loop may comprise a diode.

The diode may have the same electrical and physical properties as a photodiode of a pixel array. This diode may be a photodiode. Thus the diode of the feedback loop may be identical or at least similar compared to the photo diode in the pixel circuit. Therefore, a copy of a pixel charge in the pixel circuit may be provided with the processing circuit. Moreover, the photodiode in the feedback loop may be shielded, in order to avoid collecting light. The shielding may be provided by a mechanical shield.

According to an exemplary embodiment of the invention, the output of the amplifier may be adapted to be connected with a timer.

The current of a current source in the feedback loop may be utilized as current reference and multiplied with a time. The result may be equal to a copy of the pixel charge According to an exemplary embodiment of the invention, the output of the amplifier may be adapted to be connected with a second collecting device.

The second collector or collecting device may collect pixel information of a further row of the array of the sensor. This row may be different from the row connected to the first collecting device. In such a case a cascade of the processing circuit of the X-ray sensor may be provided. This means, that a first processing circuit of the X-ray sensor may be connected to a second processing circuit of the X-ray sensor which may be identical to the first processing circuit. Thus, each processing circuit may collect pixel information of one area, for example one single row, of the X-ray sensor, especially of a CMOS image sensor. All interconnected processing circuits together may collect pixel information of the entire pixel array of the X-ray sensor.

According to an exemplary embodiment of the invention, an X-ray detector may be provided. The X-ray detector may comprise an X-ray sensor. This X-ray sensor may comprise a second transfer function, a first pixel circuit and a second pixel circuit. The X-ray sensor may comprise a processing circuit as described above.

Thus, the X-ray sensor may be connected with the processing circuit via a collecting device, such as a multiplex switch. The second transfer function may represent the behaviour of one pixel of the X-ray sensor. The first pixel circuit may provide the same or a substantially identical transfer function as the second pixel circuit.

The X-ray detector may comprise further a sample and hold circuit which may be connected between a first source follower and a second source follower of the circuit of the X-ray sensor, especially of a pixel circuit of an image array.

According to an exemplary embodiment of the invention, a method may be provided. The method may provide a pixel information of a plurality of pixels of an X-ray sensor, comprising buffering a first pixel information, buffering a second pixel information, collecting a first pixel information, collecting a second pixel information and providing a first transfer function which is substantially identical to a second transfer function.

These and other aspects of the invention will be apparent from and elucidated with reference to the embodiments described hereafter.

It has also to be noted that exemplary embodiments of the present invention and aspects of the invention have been described with reference to different subject-matters. In particular, some embodiments have been described with reference to apparatus type claims whereas other embodiments have been described with reference to method type claims.

However, a person skilled in the art may gather from the above and the following description that unless other notified in addition to any combination between features belonging to one type of subject-matter also any combination between features relating to different subject-matters in particular between features of the apparatus claims and the features of the method claims may be considered to be disclosed with this application.

BRIEF DESCRIPTION OF THE DRAWINGS

Exemplary embodiments of the present invention are described with reference to the drawings.

DETAILED DESCRIPTION OF EXEMPLARY EMBODIMENTS

The illustration in the figures is schematic. In the following description of FIGS. 1 to 5, the same reference characters may be used for identical or corresponding elements.

Figure 1:
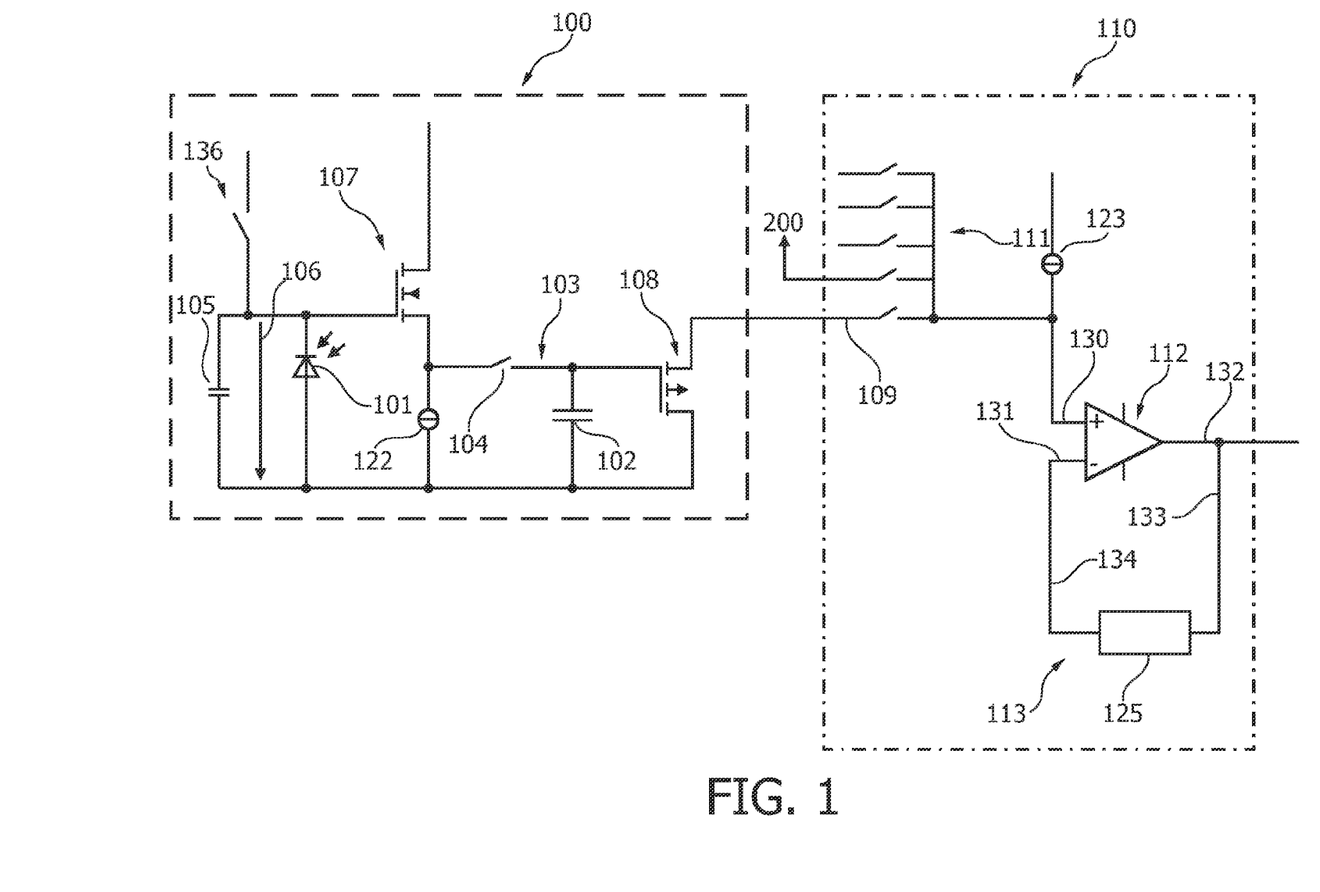
FIG. 1 shows schematically a part of a pixel array of an X-ray sensor with a first pixel circuit connected with a processing circuit for the X-ray sensor for collecting at least a first pixel information of the first pixel circuit and a second pixel information of a second pixel circuit.

FIG. 1 shows a section of an X-ray detector. This X-ray detector may be of a direct or of an indirect conversion type. In FIG. 1 the X-ray detector may be of an indirect conversion type. With this indirect conversion type, the X-ray quanta are firstly converted into light in a scintillator layer that is glued to the sensor, not shown. This light is converted into charge with a photodiode 101. The principles of the invention may also be used for direct conversion detectors.

FIG. 1 shows a part of an array of pixels, for example of a CMOS sensor. This CMOS sensor may have a square area of 20 cm×20 cm, comprising million of pixels and therefore million of pixel circuits 100. Each pixel or each pixel circuit 100, 200 comprise one photodiode 101 with an anode and a cathode in order to convert the light of the scintillator into a charge. In addition, a capacitor or a capacitance 105 may be present in the pixel circuit 100 and in all other pixel circuits 200. The capacitor or the capacitance may be for example a permanently connected capacitor or an intrinsic capacitance of the photodiode 101. For example, for direct conversion detectors a capacitor 105 may be utilized. The capacitor or capacitance 105 may be connected in parallel to the photodiode 101. A pixel voltage $V_{pixel}$ 106 may be provided as shown by an arrow in FIG. 1.

The photodiode 101 generates a pixel voltage $V_{pixel}$ 106 which is buffered by a first source follower 107, here an NMOS source follower. In FIG. 1 the sample and hold circuit 103 comprises a capacitor 102 and a switch 104. The NMOS source follower 107 comprises a gate, a source and a drain. The gate connection of the NMOS 107 is connected to the cathode of the photodiode 101. The source of the NMOS 107 is connected to a current source 122. This current source 122 may be an optional current source and may not be present in all kind of detectors. The source of the NMOS 107 is also connected to the switch 104 of the sample and hold circuit 103. Instead of the current source 122 a further switch, not shown, may be connected in parallel to the capacitor 102 of the sample a hold circuit 103. The drain connection of the NMOS 107 may be connected to a voltage-source, which is not shown.

The first source follower 107 and a second source follower 108 are used as buffers in the pixel circuit 100, respectively. Thus, the voltage of the capacitor 102 of the sample and hold circuit 103 is buffered and transferred to a periphery of the X-ray sensor, here to the periphery of a CMOS sensor, especially to a processing circuit 110, which is connected with a plurality of pixel circuits 100, 200.

In FIG. 1 in the first pixel circuit 100 the gate-connection of the PMOS source follower 108 is connected to the sample and hold circuit 103, especially to the switch 104 and at the same time to a first connection of the capacitor 102. The drain-connection of the PMOS source follower 108 is connected to a second connection of the capacitor 102 and to the anode of the photodiode 101. The anode of the photo diode 101 may be connected to a constant voltage level, such as ground.

In FIG. 1 a first reset switch 136 comprises a first connection and a second connection. The first connection of the reset switch 136 is connected to the cathode of the photodiode 101. Moreover, the first connection of the reset switch 136 is connected to the gate connection of the first source follower 107. The second connection of the reset switch is connected to a voltage source, for example to a constant voltage source.

The processing circuit or periphery circuit 110 comprises a collecting device, in FIG. 1 a multiplex switch 111 and an amplifier 112 with a feedback loop 113. The source-connection of the PMOS source follower 108 of the pixel circuit 100 is connected to a first input 109 of the multiplex switch 111, which connects a plurality of pixel circuits 100, 200 with a further part of the periphery circuit 110 of the X-ray sensor.

The multiplex switch 111 comprises a plurality of input connections in addition to the first input connection 109. The plurality of input connections of the multiplex switch 111 is connected to an output of one pixel, respectively. Thus, the multiplex switch 111 may collect electrons from each pixel or each pixel circuit 100, 200, which is connected with one input of the multiplex switch 111. The multiplex switch 111, which may be an electronic element or component, may collect the signals of one group of pixels, which signals may be transferred via the multiplex switch 111 and buffers to an electronic board of the X-ray sensor. Since the X-ray sensor may comprise millions of pixels, it may not be possible to have much dissipation in the pixel. Therefore, the buffers in the pixels, especially the first source follower 107 and the second source follower 108, may be not feedback based amplifiers, but may be source followers comprising MOSFET components.

These source followers 107, 108 may be of non-linear characteristic and may also depend on temperature influence. This temperature influence may be due to environmental factors and/or due to the duration of operation of the circuit.

In FIG. 1 a current source 123 is connected to the input of the amplifier 112, here to the positive or non-inverting input. Moreover, the current source 123 is connected with the output of the multiplex switch 111. The current source 123 of the processing circuit 110 is provided to bias the second source follower 108 in the pixel circuit 100. The current source 123 is provided in the circuit 110 for collecting the pixel information. Alternatively, a reset switch may be provided, which may be connected between the positive input of the amplifier 112 and a voltage source, which is not shown.

Figure 2:
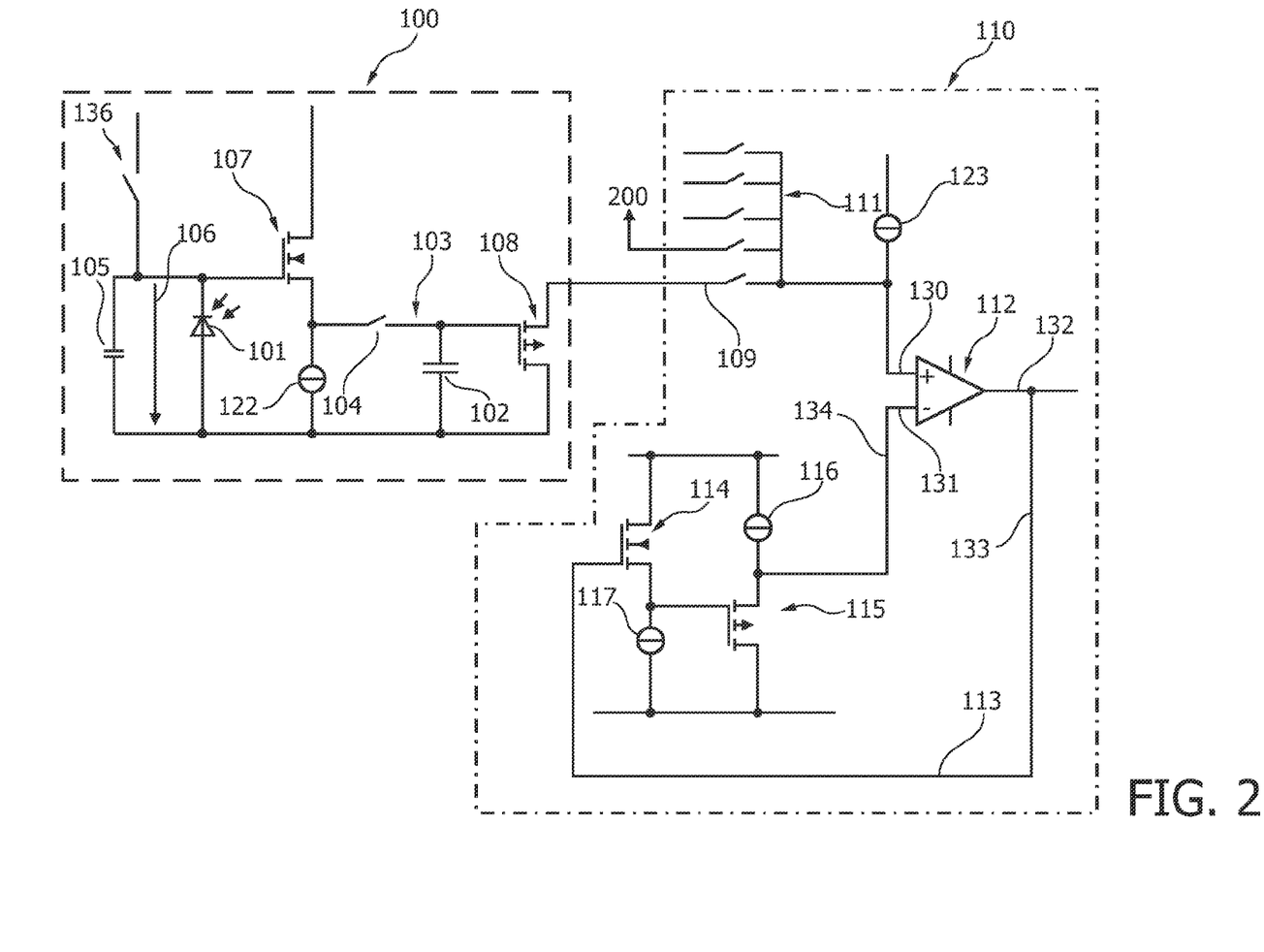
FIG. 2 shows further details of FIG. 1 according to a first exemplary embodiment of the invention.

In FIG. 2 an exemplary embodiment of the invention is shown with more details of the circuit of FIG. 1. The pixel voltage $V_{pixel}$ 106 is buffered with the NMOS source follower 107, as explained above. Via the sample and hold circuit 103 the signal $V_{pixel}$ is transferred to the second source follower 108, which is a PMOS transistor in this case. Via some switches or a collecting device, here the multiplex switch 111, the signal $V_{pixel}$ can be switched to the amplifier 112. The feedback loop 113 of the amplifier 112 comprises a plurality of MOSFETs, in FIG. 2 a NMOS component 114 and a PMOS component 115. The NMOS 114 and the PMOS 115 comprise a source connection, a drain connection and a gate connection, respectively.

The NMOS 114 and the PMOS 115 in the feedback loop 113 are identical to the first source follower 107 and the second source follower 108, meaning to the transistors in the pixel circuit 100. In other words, the NMOS 114 may correspondent to the first follower 107 and the PMOS 115 may correspondent to the second follower 108, meaning the characteristics of the corresponding components may be the same or at least similar.

Figure 3:
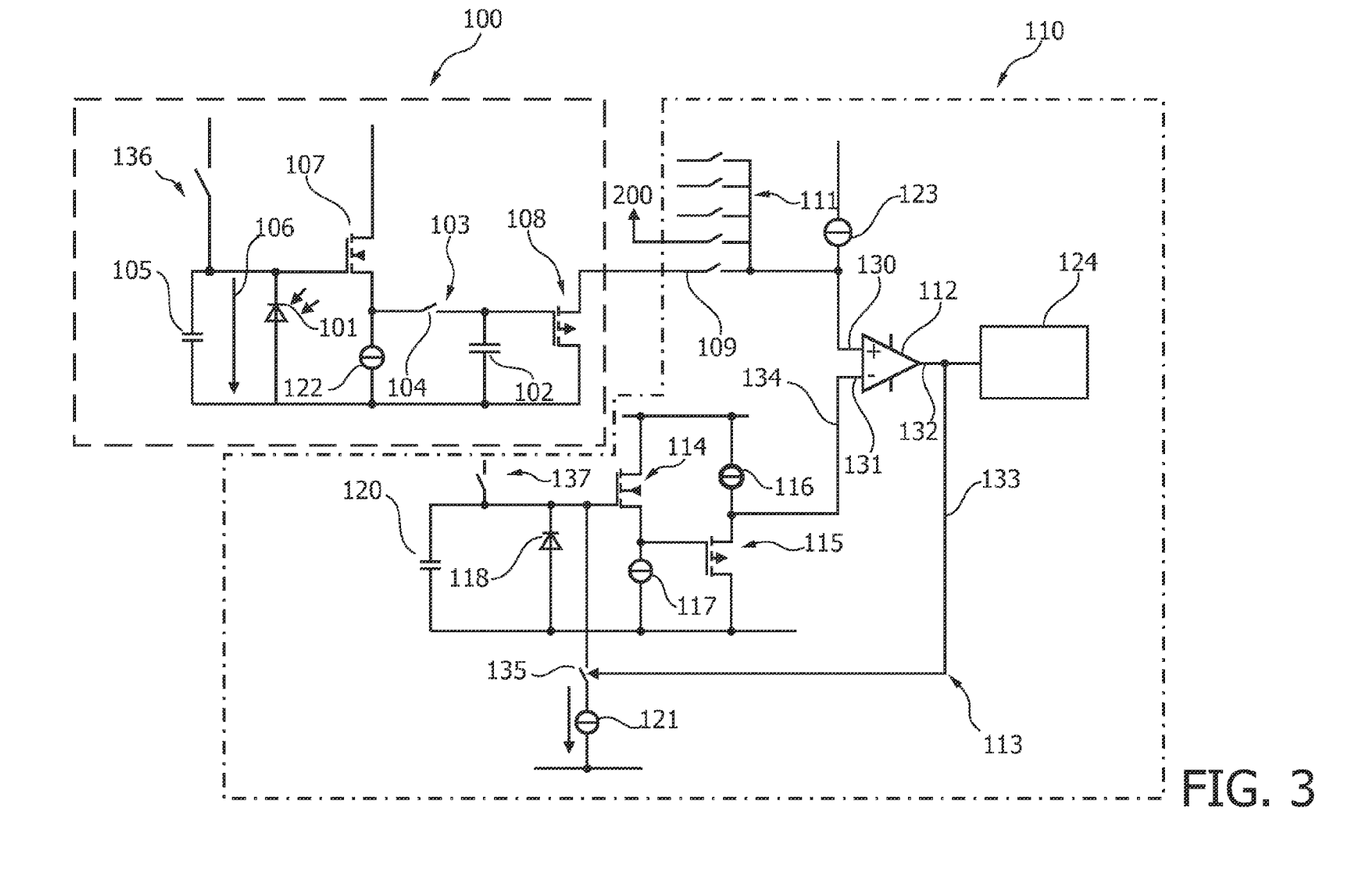
FIG. 3 shows further details of FIG. 1 according to a second exemplary embodiment of the invention.

The amplifier 112 of FIGS. 1, 2 and 3 can be connected to any pixel of a row of pixels by the multiplex switch 111. The multiplex switch 111 is connected between the PMOS source follower 108 and the amplifier 112, especially between the source connection of the PMOS source follower 108 and the non-inverting input 130 of the amplifier 112.

The feedback loop or the feedback circuit 113 may be utilized to have the same or nearly the same DC-transfer function (direct current) as the buffers of the pixel, namely the MOSFETS of the pixel, especially the NMOS and PMOS components 107, 108 in the pixel circuit 100. The feedback loop 113 may provide an increased frequency response and improved noise behaviour at its output compared to the output of the pixel circuit 100. An additional feedback path for high frequencies like a capacitor may be added to the amplifier 112 in order to improve the noise behaviour. This capacitor may be placed between an output 132 of the amplifier 112 and the inverting input 131 of the amplifier 112.

In FIG. 2 the feedback loop 113 comprises a first source follower 114 and a second source follower 115. The first source follower 114 is connected with a first current source 117 and the second source follower 115 is connected with a second current source 116. Thus, the first source follower 114 is biased by the first current source 117. In addition, the second source follower 115 is biased by the second current source 116.

The MOSFETs as buffers in the feedback loop 113 may be biased by current sources, such as current sources 116, 117 in the feedback loop 113. Also the MOSFETS as buffers in the pixel circuit 100 may be biased by further current sources, which may be present in the pixel circuit, such as current source 122 and which may be also present in the processing circuit, such as current source 123.

A first buffer in the processing circuit 110, comprising source follower 114, in the feedback loop 113 corresponds to a third buffer in the pixel circuit comprising the first source follower 107. A second buffer in the processing circuit 110, comprising source follower 115, corresponds to the second source follower 108 of the pixel circuit 100 or to the second buffer in the pixel circuit 100 connected to the positive input 130 of the amplifier 112.

The first source follower 114 in the feedback loop 113 is a NMOS source follower and the second source follower 115 in the feedback loop 113 is a PMOS source follower. The NMOS source follower 114 and the PMOS source follower 115 comprise a gate connection, a source connection and a drain connection, respectively.

The gate connection of the PMOS 115 is connected with the source connection of the NMOS 114. The gate connection of the PMOS 115 is further connected with the first current source 117. The source connection of the PMOS 115 is connected with the second current source 116 and with an output 134 of the feedback loop, which output 134 is connected with the negative or inverse input 131 of the amplifier 112. The drain connection of the NMOS 114 is connected with the second current source 116. The drain connection of the NMOS 114 is further connected with a constant voltage level, which is not shown. The PMOS 115 is biased by the second current source 116. The drain connection of the PMOS 115 may be connected with a constant voltage level, such as ground.

FIG. 2 shows a processing circuit of an X-ray sensor for providing or making a copy of the pixel voltage. According to another exemplary embodiment it is also possible to provide or make a copy of the pixel charge, which is shown in FIG. 3 according to an exemplary embodiment of the invention. FIG. 3 shows a similar circuit as shown in FIG. 2, wherein the feedback loop 113 comprises additional components compared to the feedback loop 113 of FIG. 2.

In FIG. 3 a further part of the feedback loop 113 is given. A second photodiode 118 comprises an anode and a cathode. The first photodiode 101 provides a pixel charge which may be compensated within the feedback loop 113. The second diode 118 may also be a photodiode and may be identical or substantially identical to the first photodiode 101. The photodiode 118 may be shielded, in order not to collect light. The diode 118 may have the same capacitance as the photodiode 101 of the pixel circuit 100. In FIG. 3 the cathode of the second photodiode 118 is connected with the gate of the first source follower 114. The anode of the second photodiode 118 is connected with the drain of the second source follower 115, which is the drain connection of the PMOS 115. Moreover, the anode of the second photodiode 118 is connected to a connection of the capacitor 120 and to a constant voltage level, such as ground.

In FIG. 3 the anode of the second diode 118 is connected to the first current source 117 and to a constant voltage level, such as ground. The cathode of the second diode 118 is connected via a switch 135 to the current reference source 121, to the gate connection of the NMOS 114, and to the capacitor 120, which may be present in case the capacitor 105 is present.

In FIG. 3 and also shown in FIG. 1 and FIG. 2, the first reset switch 136 comprises a first connection and a second connection. The first connection of the first reset switch 136 is connected to the cathode of the photodiode 101. Moreover, the first connection of the reset switch 136 is connected to the gate connection of the first source follower 107. The second connection of the reset switch 136 is connected to a voltage source, for example to a constant voltage source. Furthermore, in FIG. 3 a second reset switch 137 comprises a first connection and a second connection. The first connection of the second reset switch 137 is connected to the cathode of the second diode 118. Moreover, the first connection of the second reset switch 137 is connected to the gate connection of the source follower 114. In addition, the first connection of the reset switch is connected to the switch 135 in the feedback loop 113 of the amplifier 112. The second connection of the second reset switch 137 is connected to a voltage source, for example to a constant voltage source.

The input 133 of the feedback loop 113 is connected to a switch 135, which input 133 may influence the position of the switch 135. In an on-position of the switch, 135, the switch 135 connects the current reference source 121 to a circuit of the feedback loop comprising the NMOS 114, the PMOS 115, the second current source 116, the first current source 117, the second diode 118 and the capacitor 120. In an off-position of the switch 135, the feedback loop 113 is interrupted and the input 133 and the output 134 of the feedback loop 113 are disconnected.

In FIG. 3 with a reference current provided by the current reference source 121 the amount of charge may be measured. A timer 124 of the processing circuit 110 is connected to the output 132 of the amplifier 112. For measuring the pixel charge it may take more time for the measurement compared to a measurement of a pixel voltage. Thus, the timer 124 may provide the time how long it may take that the minus input or the negative input of the amplifier 112 receives the same signal as the signal of the positive input of the amplifier 112. Thus, the timer 124 may be active for that time and may count the time until the input signal at the second input 131 is identical or substantially identical as the input signal at the first input 130 of the amplifier 112. The value of the current reference provided by the reference current source 121 multiplied with the active time of the timer 124 may provide a value of the pixel charge, meaning a copy of the pixel charge.

In other words, when the switch 135 is in the on-position, then the timer 124 may count the time until the voltage across the second diode 118 is the same as the voltage across the first photodiode 101. This time may represent the charge of the pixel circuit 100. The timer 124 allows to obtain a measurement of the charge on the pixel photodiode 101 from the time it takes to reach the same voltage in the processing circuit 110 or replica of the pixel circuit 100 as from the pixel. In other words, the current source 121 provides a known current to the shielded photodiode 118. Multiplying this current with the active time of the timer 124 gives a direct measurement of the charge on photodiode 118 and thus on the pixel photodiode 101. The timer 124 may provide a digital information and therefore the timer 124 may act as an analog-digital converter (A-D converter) in the processing circuit.

Figure 4:
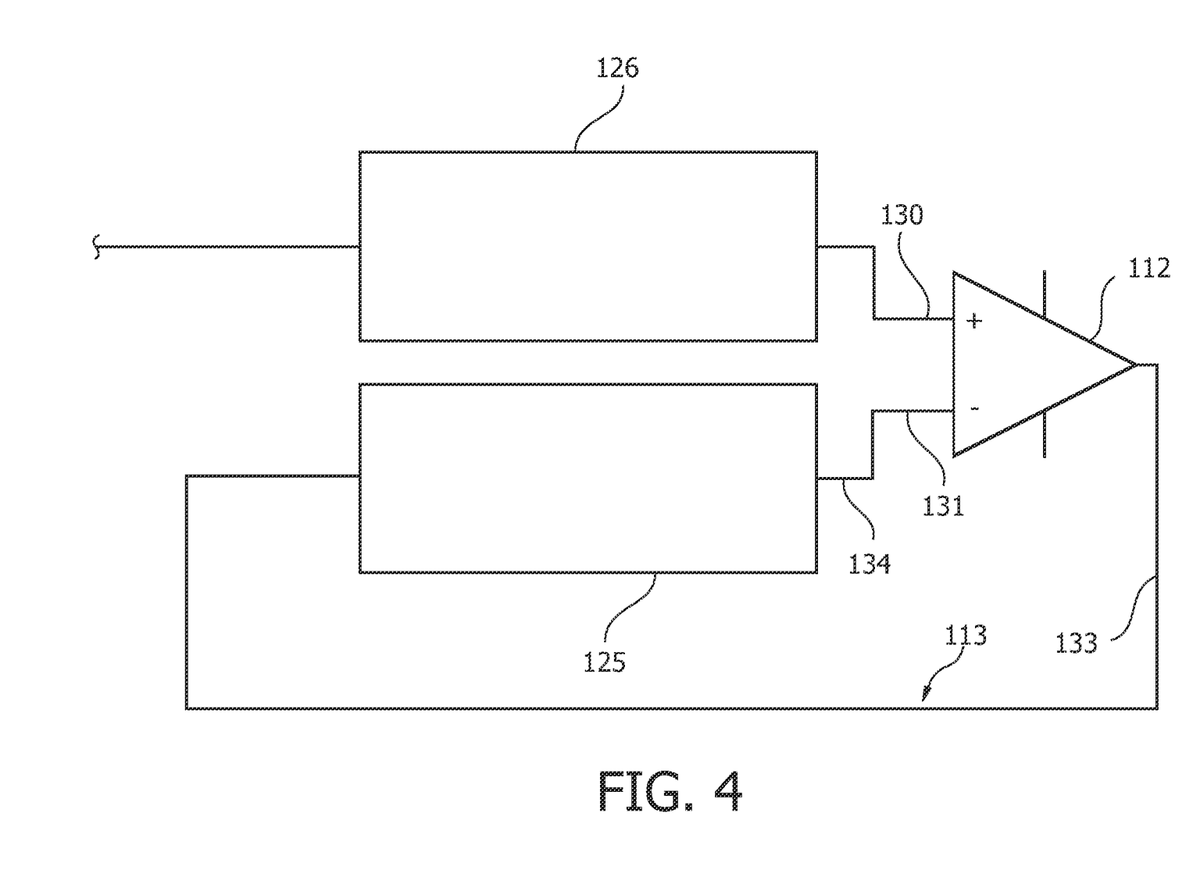
FIG. 4 shows an exemplary embodiment of a circuit of an X-ray detector comprising a first transfer function and a second transfer function.

FIG. 4 shows an exemplary embodiment of a circuit of an X-ray detector comprising a first transfer function 125 and a second transfer function 126. FIG. 4 shows schematically how a compensation for a non-linearity in the pixels by applying an inverse non-linearity in the periphery of the sensor may be provided. The buffers in the pixels or in the pixel circuits 100, 200 provide a non-linear temperature dependent transfer function $V_{out}=F(V_{in,temp})$ 126, respectively. The same transfer function $V_{out}=F(V_{in,temp})$ 125 is applied in the feedback loop 113 of the amplifier 112 in the periphery of the sensor. The amplifier 112 may control its output 133 in such a way such that the negative input 131 has the same voltage as the positive input 130, which is the output of the buffered pixel value. This means that the output voltages of both non-linear circuits are the same. As long as the circuits give the same transfer function the input voltages might be identical or substantially identical. This means that a copy of the pixel voltage may be realized in the periphery of the sensor. In the case the pixel charge may be utilized, a copy of the pixel charge may be provided in the periphery of the sensor in a similar way as shown in FIG. 4.

Thus, according to an aspect of the invention a compensation for the non-linearity in the pixels of an X-ray sensor may be provided by applying an inverse non-linearity in the periphery of the X-ray sensor. This may be realized by applying the same non-linearity of the pixel in the feedback loop 113 of the amplifier 112 in the periphery of the X-ray sensor. The amplifier 112 might control its output such that the negative input has the same voltage as the positive input, which is the output of the buffered pixel value. This means that the output voltages of both non-linear circuits are the same or almost the same.

Figure 5:
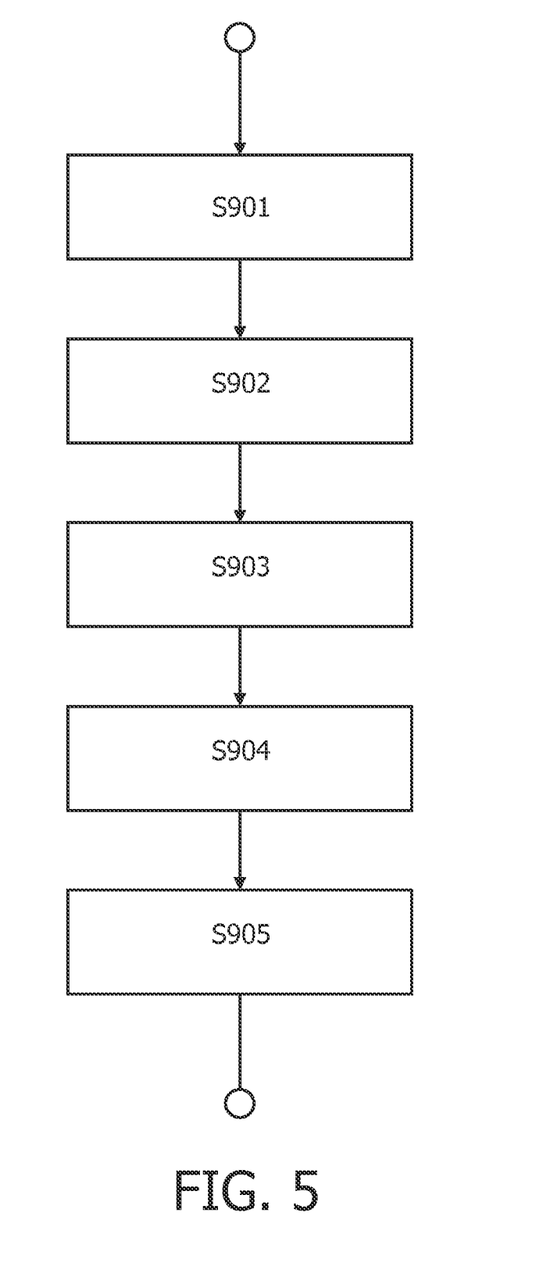
FIG. 5 shows a diagram of another exemplary embodiment showing a method according to an exemplary embodiment of the invention.

FIG. 5 shows a diagram of a method for providing a pixel information of a plurality of pixels of an X-ray sensor. In a first step S901 a first pixel information may be buffered. In a second step S902 a second pixel information may be buffered. Step S901 and step S902 may be also performed in a reverse order or at the same time. In a further step S903 a collecting of a first pixel information may be performed. Further, a collection of a second pixel information may be provided in step S904. Step S903 and step S904 may be also performed in a reverse order or at the same time. Moreover, in step S905 the first transfer function 125 may be provided which first transfer function 125 is substantially identical to the second transfer function 126.

The invention may be applicable in different kinds of sensors, especially in image sensors, such as CMOS image sensors which may be used in X-ray devices and in X-ray detectors, especially in CMOS X-ray detectors.

The invention may be used for one-dimensional sensor arrays or line sensors, two-dimensional sensors or arrays as well as for three-dimensional sensors or arrays, especially for image sensors. It should be noted, that all expressions in this application relating to pixels are also valid for voxels. The term "pixel" may be utilized in relation to two-dimensional arrays and the term "voxel" may be utilized in relation to three-dimensional arrays. Thus, the pixel circuits 100, 200 described above may also be voxel circuits.

The invention is not limited to the disclosed embodiments, and gives examples of as many alternatives as possible for the features included in the embodiments discussed.

In addition, it should be pointed out that "comprising" does not exclude other elements or steps, and "a", "an" or "one" does not exclude a plural number.

Moreover, features cited in separate dependent claims may be advantageously combined.

Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A processing circuit for an X-ray sensor for collecting at least a first pixel information of a first pixel circuit and a second pixel information of a second pixel circuit, the processing circuit comprises:
an amplifier;
a feedback loop including a photodiode and a first source follower connected in series with each other; and
a first collecting device connected to at least one of the first pixel circuit and the second pixel circuit, and having an output coupled to the amplifier;
wherein the amplifier comprises a first amplifier input, a second amplifier input and an amplifier output,
wherein the feedback loop comprises a feedback loop input and a feedback loop output, wherein the first amplifier input is connected with the first collecting device, wherein the second amplifier input is connected with the feedback loop output,
wherein the first collecting device is adapted to be connected with the first pixel circuit of the X-ray sensor and configured to collect the first pixel information, wherein the first collecting device is adapted to be connected with the second pixel circuit of the X-ray sensor and configured to collect the second pixel information, and
wherein the feedback loop input is connected with the output of the amplifier, wherein the feedback loop comprises a first transfer function, the first transfer function is substantially identical to a second transfer function of the X-ray sensor.

2. The processing circuit of claim 1, wherein the first pixel information and the second pixel information are each a pixel voltage.

3. The processing circuit of claim 1, wherein the first pixel information and the second pixel information are each a pixel charge.

4. The processing circuit of claim 1, wherein the first transfer function is a non-linear transfer function.

5. The processing circuit of claim 1, wherein the first transfer function is a voltage dependent transfer function.

6. The processing circuit of claim 1, wherein the first transfer function is a temperature dependent transfer function.

7. The processing circuit of claim 1, wherein the first source follower is a first buffer.

8. The processing circuit of claim 1, wherein the feedback loop comprises a second source follower configured as a second buffer.

9. The processing circuit of claim 1, wherein the feedback loop comprises at least one current source.

10. The processing circuit of claim 1, wherein the feedback loop comprises a capacitor.

11. The processing circuit of claim 1, wherein the photodiode is shielded from incident light and is connected in parallel to a current source.

12. The processing circuit of claim 1, wherein the amplifier output is adapted to be connected with a timer.

13. The processing circuit of claim 1, wherein the amplifier output is adapted to be connected with a second collecting device.

14. An X-ray detector comprising: an X-ray sensor, wherein the X-ray sensor comprises a second transfer function, a first pixel circuit and a second pixel circuit, wherein the X-ray sensor comprises the processing circuit of claim 1.

15. The processing circuit of claim 1, wherein the first collecting device is a multiplexing switch.

16. The processing circuit of claim 1, wherein the feedback loop includes at least one component substantially identical to at least one corresponding component in the first pixel circuit or the second pixel circuit.

17. The processing circuit of claim 1, wherein the photodiode is connected in parallel to a first current source, and wherein the first source follower is connected in parallel to a second current source.

18. The processing circuit of claim 1, wherein the photodiode is connected in parallel to a second source follower.

19. A method for providing a pixel information of a plurality of pixels of an X-ray sensor, the method comprising:
buffering, at a first buffer, a first pixel information associated with a first pixel in the plurality of pixels;
buffering, at a second buffer, a second pixel information associated with a second pixel in the plurality of pixels;
collecting a first pixel information at a collecting device from the first buffer;

collecting a second pixel information at the collecting device from the second buffer, wherein the collecting device is connected to at least one of the first pixel circuit and the second pixel circuit, an output of the collecting device being coupled to an amplifier;

providing the collected first pixel information to the amplifier;

providing the second pixel information to the amplifier; and providing a feedback loop coupled to the amplifier, the feedback loop including a photodiode and a first source follower connected in series with each other to control a linearity of the first pixel and the second pixel.

20. The method of claim 19, wherein the input of the amplifier includes a positive input and a negative input, wherein said providing the collected first pixel information to the amplifier includes providing a first transfer function, based upon the first pixel information, to the negative input of the amplifier, and wherein providing the collected second pixel information to the amplifier includes providing a second transfer function, based upon the second pixel information, to the positive input of the amplifier, said first transfer function being substantially identical to said second transfer function.

* * * * *